US007876416B2

United States Patent
Nagaoka et al.

(10) Patent No.: US 7,876,416 B2
(45) Date of Patent: Jan. 25, 2011

(54) LIQUID CRYSTAL DISPLAY DEVICE

(75) Inventors: Masafumi Nagaoka, Chiba (JP); Takayuki Ota, Oamishirasato (JP); Kazuyoshi Tanaka, Mobara (JP); Akio Tezuka, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 191 days.

(21) Appl. No.: 12/358,586

(22) Filed: Jan. 23, 2009

(65) Prior Publication Data
US 2009/0190063 A1 Jul. 30, 2009

(30) Foreign Application Priority Data
Jan. 29, 2008 (JP) .............................. 2008-017730

(51) Int. Cl.
*G02F 1/1333* (2006.01)
(52) U.S. Cl. .................... 349/161; 349/58; 362/218; 362/294; 362/373
(58) Field of Classification Search .................. 349/161
See application file for complete search history.

(56) References Cited
U.S. PATENT DOCUMENTS
7,438,450 B2 * 10/2008 Aoki et al. .................. 362/373

2006/0104067 A1 5/2006 Hwang
2008/0019125 A1 1/2008 Hsu

FOREIGN PATENT DOCUMENTS
JP 2005-084270 3/2005

\* cited by examiner

*Primary Examiner*—Richard H Kim
(74) *Attorney, Agent, or Firm*—Antonelli, Terry, Stout & Kraus, LLP.

(57) ABSTRACT

A liquid crystal display device includes a liquid crystal display panel and a backlight disposed at a rear surface of the liquid crystal display panel. The backlight includes a light source, a frame housing the light source, a heat dissipating plate disposed inside the frame, and a reflective sheet disposed at a surface of the heat dissipating plate on the liquid crystal display panel side. The heat dissipating plate is formed with a heat dissipating fin protruding to a surface of the frame on the side opposite to the liquid crystal display panel through an opening formed through the frame in a portion corresponding to the upper portion thereof and formed with an opening which is closed with the frame and the reflective sheet in a portion corresponding to the lower portion thereof.

7 Claims, 4 Drawing Sheets

LIQUID CRYSTAL DISPLAY DEVICE

CROSS-REFERENCE TO RELATED APPLICATION

The present application claims priority from Japanese application JP2008-17730 filed on Jan. 29, 2008, the content of which is hereby incorporated by reference into this application.

BACKGROUND OF THE INVENTION

The present invention relates to a liquid crystal display device and to a liquid crystal display device provided with a so-called direct type backlight.

In a liquid crystal display device, a so-called direct type backlight which can attain the uniformity of a surface light source has been used as a backlight along with the trend toward increasing the size of the liquid crystal display panel thereof.

The backlight has a plurality of rod-shaped light sources including, for example, fluorescent tubes disposed in parallel in a plane facing to the liquid crystal display panel and a frame supporting the rod-shaped light sources, and is provided with a reflective sheet disposed at a surface of the frame, the surface supporting the rod-shaped light sources.

In this case, it is necessary to dissipate heat generated from the rod-shaped light sources to outside the liquid crystal display device so as not to accumulate the heat in the liquid crystal display device.

For example, this is for the purpose of avoiding deterioration of characteristics of a semiconductor device, which is incorporated into the liquid crystal display device in order to drive each pixel of a liquid crystal display panel, due to the heat.

To this end, a liquid crystal display device has been known in which heat dissipating means having a heat dissipating fin is disposed at the surface of the frame on the side opposite to the liquid crystal display panel. The liquid crystal display device having such a configuration is disclosed in, for example, JP-A-2005-84270.

SUMMARY OF THE INVENTION

However, the above-described liquid crystal display device is configured such that heat dissipating means dissipates heat generated from a fluorescent tube via a frame.

This restricts the selection of material for the frame when importance is attached to the function as a frame, and the frame has to be formed of, for example, a material having an unfavorable thermal conductivity.

In view of the above, regarding the material forming the heat dissipating means, it is desirable to form the heat dissipating means with a material excellent in thermal conductivity in all the heat conduction paths and to diffuse heat without intervening the frame.

Further, some liquid crystal display devices are used in a standing state with respect to a horizontal plane during driving. In this case, when uniform heat dissipating means is provided over the entire area of a display area of the liquid crystal display device, a problem that heat cannot be uniformly diffused actually occurs due to the influence of heat convention, which is not referred to in JP-A-2005-84270.

It is an object of the invention to provide a liquid crystal display device excellent in heat dissipation effect.

It is another object of the invention to provide a liquid crystal display device which can uniformly diffuse heat in a liquid crystal display area.

A typical outline of the invention disclosed herein will be described below.

(1) A liquid crystal display device according to the invention is, for example, a liquid crystal display device which is used in a standing state with respect to a horizontal plane. The liquid crystal display device includes a liquid crystal display panel and a backlight disposed at back of the liquid crystal display panel. The backlight includes a plurality of light sources disposed in parallel in a plane facing to the liquid crystal display panel, a frame housing the light sources, a heat dissipating plate disposed inside the frame, and a reflective sheet disposed at a surface of the heat dissipating plate on the liquid crystal display panel side. The heat dissipating plate is formed with a heat dissipating fin protruding to a surface of the frame on the side opposite to the liquid crystal display panel through an opening formed through the frame in a portion corresponding to the upper portion thereof and formed with an opening which is closed with the frame and the reflective sheet in a portion corresponding to the lower portion thereof.

(2) In the liquid crystal display device according to the invention, for example, based on the configuration of (1), the heat dissipating fin of the heat dissipating plate is formed by raising a part of the heat dissipating plate, and an opening is formed through the frame at a location facing to an opening of the heat dissipating plate formed by raising the heat dissipating plate.

(3) In the liquid crystal display device according to the invention, for example, based on the configuration of (1), the frame is formed of aluminum or iron.

(4) In the liquid crystal display device according to the invention, for example, based on the configuration of (1), the heat dissipating plate is formed of a material having a thermal conductivity higher than that of the frame.

(5) In the liquid crystal display device according to the invention, for example, based on the configuration of (1), the heat dissipating fin is provided in plural dispersedly in the portion corresponding to the upper portion of the heat dissipating plate.

(6) In the liquid crystal display device according to the invention, for example, based on the configuration of (1), the opening formed in the portion corresponding to the lower portion of the heat dissipating plate is provided in plural dispersedly.

(7) In the liquid crystal display device according to the invention, for example, based on the configuration of (1), the heat dissipating fin has a shape extending in the vertical direction when viewed in a plane with respect to the heat dissipating plate.

The invention is not limited to the above configurations and can be changed in various ways without departing from the technical idea of the invention.

The thus configured liquid crystal display device can further effectively dissipate heat.

In addition, the thus configured liquid crystal display device can uniformly diffuse heat in a liquid crystal display area.

DESCRIPTION OF THE PREFERRED EMBODIMENTS

Hereinafter, embodiments of a liquid crystal display device according to the invention will be described using the drawings.

Figure 1B:
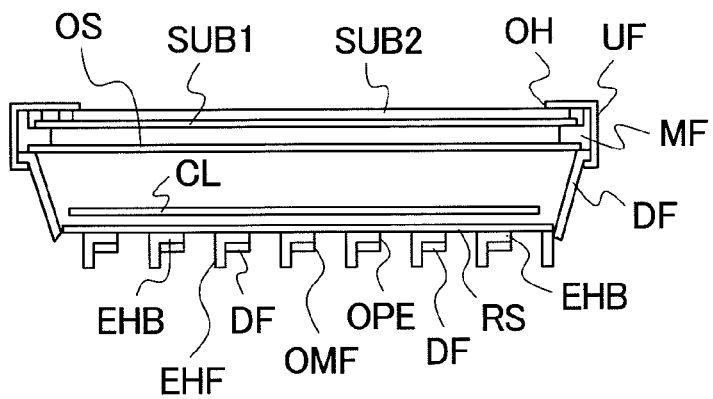
FIG. 1B is a cross sectional view taken along the line b-b in FIG. 1A.
Figure 2A:
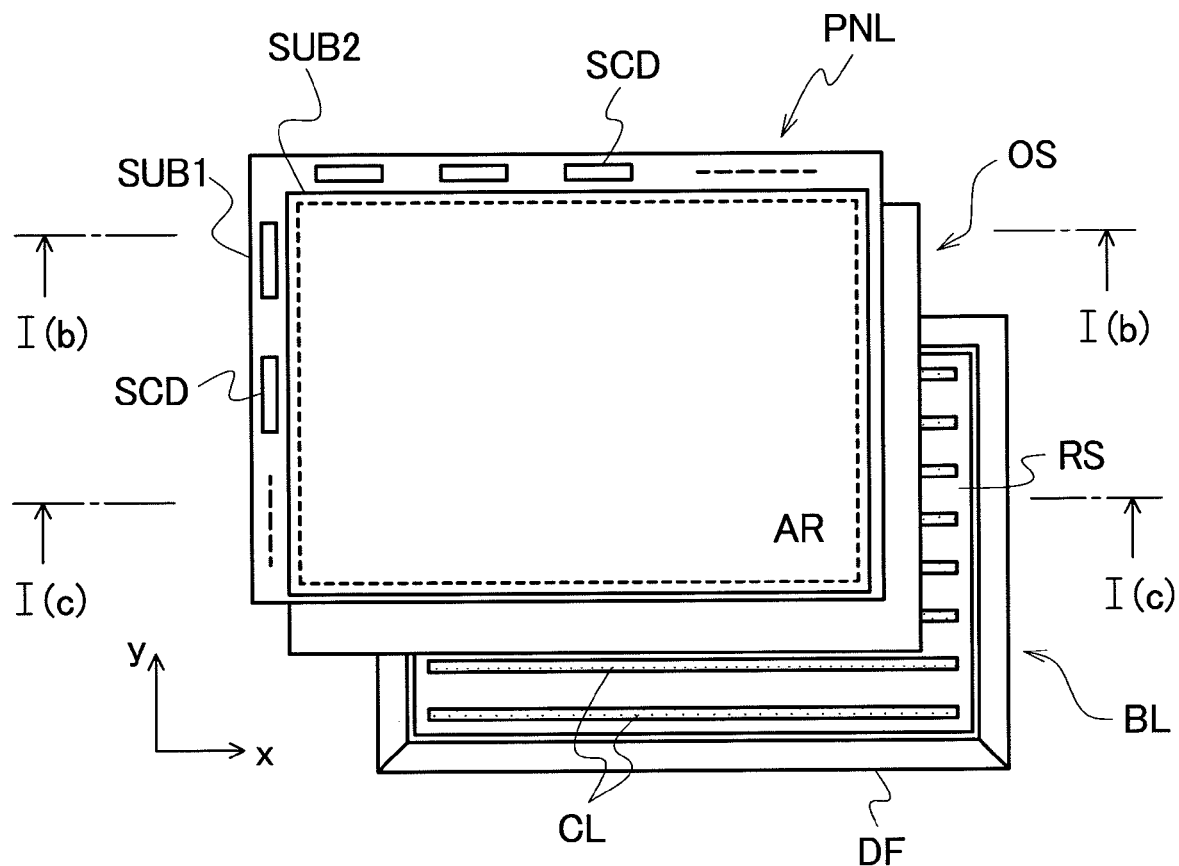
FIG. 2A is a schematic configuration view showing an embodiment of a liquid crystal display device according to the invention, showing an exploded perspective view of the liquid crystal display device.

FIG. 2A is a schematic configuration view showing an embodiment of the liquid crystal display device according to the invention, showing an exploded perspective view of a liquid crystal display panel PNL, an optical sheet OS, and a backlight BL. Although the liquid crystal display panel PNL, the optical sheet OS, and the backlight BL are modularized with an upper frame (indicated by the reference sign UF in FIG. 1B), a middle frame (indicated by the reference sign MF in FIG. 1B), and a lower frame (indicated by the reference sign DF in FIG. 1B) as will be described later, the illustration of the upper frame, the middle frame, and the lower frame is omitted in FIG. 2A.

In FIG. 2A, first, the liquid crystal display panel PNL, the optical sheet OS, and the backlight BL are sequentially arranged from the observer side.

The liquid crystal display panel PNL includes a pair of substrates SUB1 and SUB2 disposed in parallel and made of, for example, glass as an outer casing and liquid crystal interposed between the substrates SUB1 and SUB2.

Pixels (not illustrated) arranged in a matrix each having the liquid crystal as a constituent element are formed at each surface of the substrates SUB1 and SUB2 on the liquid crystal side, and the light transmittance ratio of the liquid crystal can be controlled for each of the pixels.

With an area formed with the pixels as a liquid crystal display area AR (area surrounded by the dotted line in the drawing), light from the backlight BL described later is irradiated to the entire area of the liquid crystal display area AR, whereby images are recognized by an observer through the light transmitting through the pixels.

The substrate SUB1 disposed backward with respect to the observer side is formed to have an area larger than that of the substrate SUB2. On the periphery of the substrate SUB1 exposed from the substrate SUB2, semiconductor devices SCD each including a circuit for independently driving each of the pixels are mounted.

At the rear surface of the liquid crystal display panel PNL, the backlight BL is disposed via the optical sheet OS including, for example, a diffusion sheet and a prism sheet, or a laminated body of the diffusion sheet and the prism sheet. The optical sheet OS guides the light from the backlight BL to the liquid crystal display panel PNL side while diffusing or collecting the light.

The backlight BL, which is referred to as of the so-called direct type, is provided with the lower frame DF which houses a plurality of light sources CL including, for example, fluorescent tubes, the light sources CL being disposed in parallel in the y direction in the drawing with their longitudinal directions coinciding with the x direction in the drawing in a plane parallel to the liquid crystal display panel PNL. The light source CL may be not a fluorescent tube but a light-emitting diode (LED).

The lower frame DF is formed of, for example, aluminum or iron and has a box shape, and the side wall surfaces thereof are disposed inclinedly while widening obtusely with respect to the bottom surface. The lower frame DF formed of such a material is subjected to a treatment such as corrosion protection on the surface thereof, which also causes to make its thermal conductivity lower than that of a heat dissipating plate (indicated by the reference sign EHB in FIGS. 1A, 1B, and 1C) described later. The material of the lower frame DF is not necessarily limited to the above-described one and may be a resin or the like.

A reflective sheet RS is disposed at the back of the rod-shaped light sources CL on the liquid crystal display panel PNL side of the lower frame DF, whereby the light from the rod-shaped light sources CL is reflected on the reflective sheet RS so as to be directed to the liquid crystal display panel PNL side.

Although not illustrated in FIG. 2A, the heat dissipating plate EHB (refer to FIG. 1A and FIG. 1B) formed of a material having a thermal conductivity higher than that of the lower frame DF is disposed between the reflective sheet RS and the lower frame DF. The heat dissipating plate EHB has a size to face, for example, at least to the liquid crystal display area AR of the liquid crystal display panel PNL.

Figure 2B:
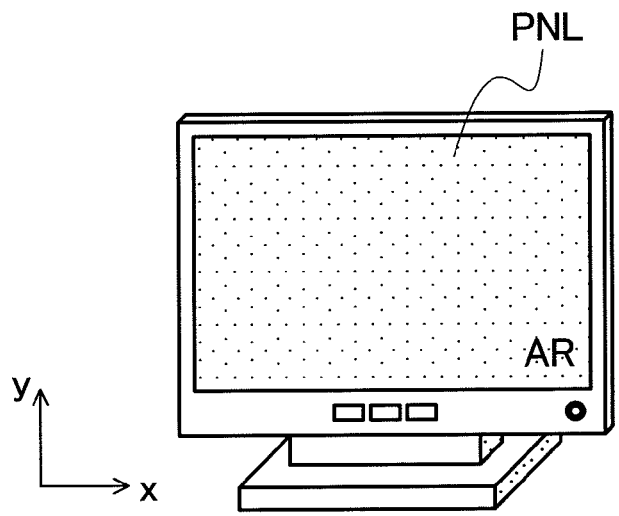
FIG. 2B is an overall view showing an example of usage of a liquid crystal display device.

The liquid crystal display device according to the invention is used in a standing state with respect to a horizontal plane as shown in FIG. 2B. In this case, the vertical direction of the liquid crystal display panel PNL, the optical sheet OS, and the backlight BL of the liquid crystal display device corresponds to the vertical direction in the drawing of the liquid crystal display panel PNL, the optical sheet OS, and the backlight BL shown in FIG. 2A.

Figure 1A:
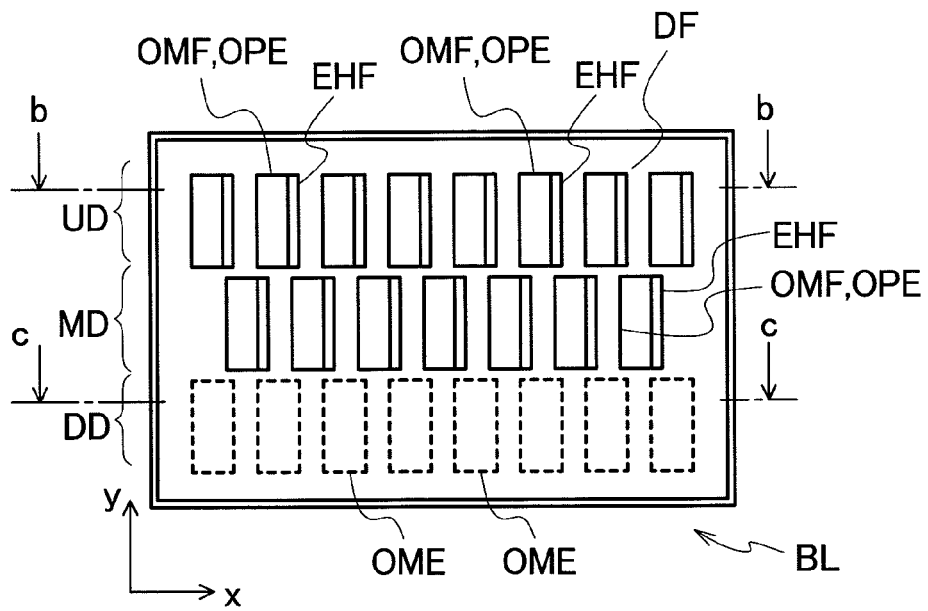
FIG. 1A is a configuration view of a main part showing an embodiment of a liquid crystal display device according to the invention when the liquid crystal display device is viewed from the side (rear surface side) opposite to an image observation side.

FIG. 1A shows the configuration of the backlight BL as viewed from the surface (corresponding to the rear surface for the observer) on the side opposite to the side where the liquid crystal display panel PNL is disposed.

FIG. 1A shows the state in which the backlight BL shown in FIG. 2A is turned over by reversing left and right without turning upside down.

In FIG. 1A, the lower frame DF has three divided areas of, for example, an upper stage area UD, a middle stage area MD, and a lower stage area DD each parallel to the horizontal direction from the upper portion to the lower portion thereof in the drawing. In the area UD and the area MD among the areas, heat dissipating fins EHF each integrally formed with the heat dissipating plate EHB protrude through openings OMF formed through the lower frame DF. On the other hand, openings corresponding to the openings OMF are not formed through the lower frame DF in the area DD, and also the heat dissipating fins EHF do not protrude.

That is, in the area UD, the plurality of openings OMF disposed in parallel in the x direction in the drawing are formed through the lower frame DF and each formed to have, for example, a rectangular shape extending in the y direction in the drawing. The heat dissipating fin EHF formed integrally with the heat dissipating plate EHB disposed on the surface of the lower frame DF on the liquid crystal display panel PNL side is formed so as to protrude to the surface of the lower frame DF on the side opposite to the liquid crystal display panel PNL through the opening OMF.

The heat dissipating fin EHF is disposed close to the long side (for example, the long side on the right in the drawing) of the opening OMF on one side and formed to have a plate shape extending in the y direction in the drawing.

The heat dissipating fin EHF is formed to have the plate shape extending in the y direction in the drawing, that is, extending in the vertical direction when the liquid crystal display device is used in a standing state with respect to a horizontal plane, whereby it is possible to avoid, for example, dust or the like in the atmosphere from accumulating on the heat dissipating fin EHF.

The area MD is similar to the area UD except that the heat dissipating fins EHF are shifted by a half pitch with respect to the heat dissipating fins EHF in the area UD.

That is, the area MD is similar to the area UD in that the plurality of openings OMF disposed in parallel in the x direction in the drawing are formed through the lower frame DF, that each of the openings OMF is formed to have the rectangular shape extending in the y direction in the drawing, that the heat dissipating fin EHF formed integrally with the heat dissipating plate EHB protrudes through the opening OMF, and that the heat dissipating fin EHF is disposed close to the side of the opening OMF on the right in the drawing and formed to have the plate shape extending in the y direction in the drawing.

The heat dissipating fins EHF in the area MD are shifted by a half pitch with respect to the heat dissipating fin EHF in the area UD in order to uniform the effect of heat dissipation due to the heat dissipating fins EHF.

As described above, the heat dissipating plate EHB is formed of a material having a better thermal conductivity than that of the lower frame DF, and the heat dissipating fins EHF are formed integrally with the heat dissipating plate EHB, whereby heat can be diffused efficiently.

In the area DD, slits corresponding to the openings OMF formed in the area UD and the area MD are not formed through the lower frame DF, and therefore, also the heat dissipating fins EHF do not protrude.

However, the area DD is formed with a plurality of openings OME (shown by the dotted line in FIG. 1A) disposed in parallel in the x direction in the drawing in the heat dissipating plate EHB disposed on the surface of the lower frame DF on the liquid crystal display panel PNL side.

The lower frame DF is disposed on one surface side of the heat dissipating plate EHB, while the reflective sheet RS is disposed on the other surface side thereof. Therefore, the opening OME of the heat dissipating plate EHB is closed with the lower frame DF and the reflective sheet RS at the opening ends thereof. The opening OME may be not sealed.

Therefore, inside the opening of the heat dissipating plate EHB has a function of keeping the air with the relatively small thermal conductivity as an air layer.

Accordingly, by configuring the area DD as described above, not only can the diffusion of heat be suppressed by so much as the heat dissipating fins EHF do not exist, but also heat can be accumulated (retained) in the air layer.

Further, since heat is easily accumulated in the upper area (corresponding to the areas UD and MD) of the liquid crystal display device due to heat convection or the like, a sufficient temperature drop cannot be expected in some cases even when heat is diffused through the heat dissipating fins EHF.

On the other hand, in the lower area (corresponding to the area DD) of the liquid crystal display device, since heat is easily conducted to the upper portion of the liquid crystal display device and further diffused through the lower frame DF or the like, the temperature is unnecessarily dropped in some cases.

Therefore, heat cannot be uniformly distributed in the liquid crystal display area AR of the liquid crystal display device, which rather requires to actively retain heat in the area DD.

In the above-described embodiment, the opening OME is formed through the heat dissipating plate EHB which is interposed between the lower frame DF and the reflective sheet RS in the area DD, whereby the opening OME is provided with the air layer in which heat is retained.

Accordingly, an effect that the uniformity of heat can be easily controlled in the liquid crystal display area is provided.

Figure 3A:
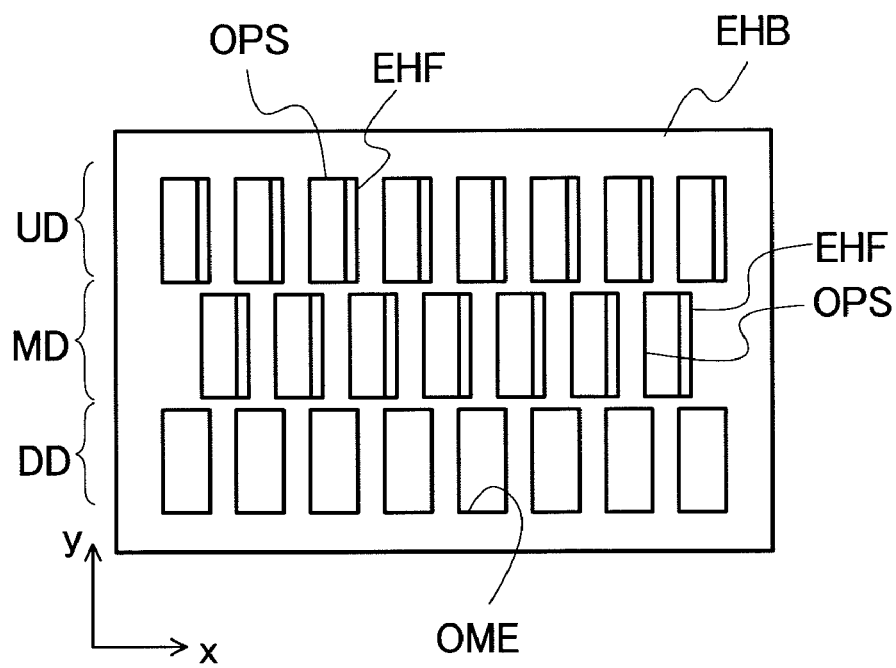
FIGS. 3A and 3B are configuration views of a heat dissipating plate and heat dissipating fins included in a liquid crystal display device according to the invention.

FIG. 3A is a plan view showing the heat dissipating plate EHB in the description of FIG. 1A extracted as it is without turning upside down and without reversing left and right.

In FIG. 3A, the heat dissipating plate EHB is formed with the plurality of heat dissipating fins EHF disposed in parallel in the x direction in the drawing in the area UD and formed with the heat dissipating fins EHF disposed in parallel in the x direction in the drawing while being shifted by a half pitch from the heat dissipating fins EHF of the area UD in the area MD.

In the area DD, the plurality of openings OME disposed in parallel in the x direction in the drawing are formed.

As apparent from FIG. 3A, the openings OPE are formed at locations adjacent to the heat dissipating fins EHF in the areas UD and MD.

Figure 4:
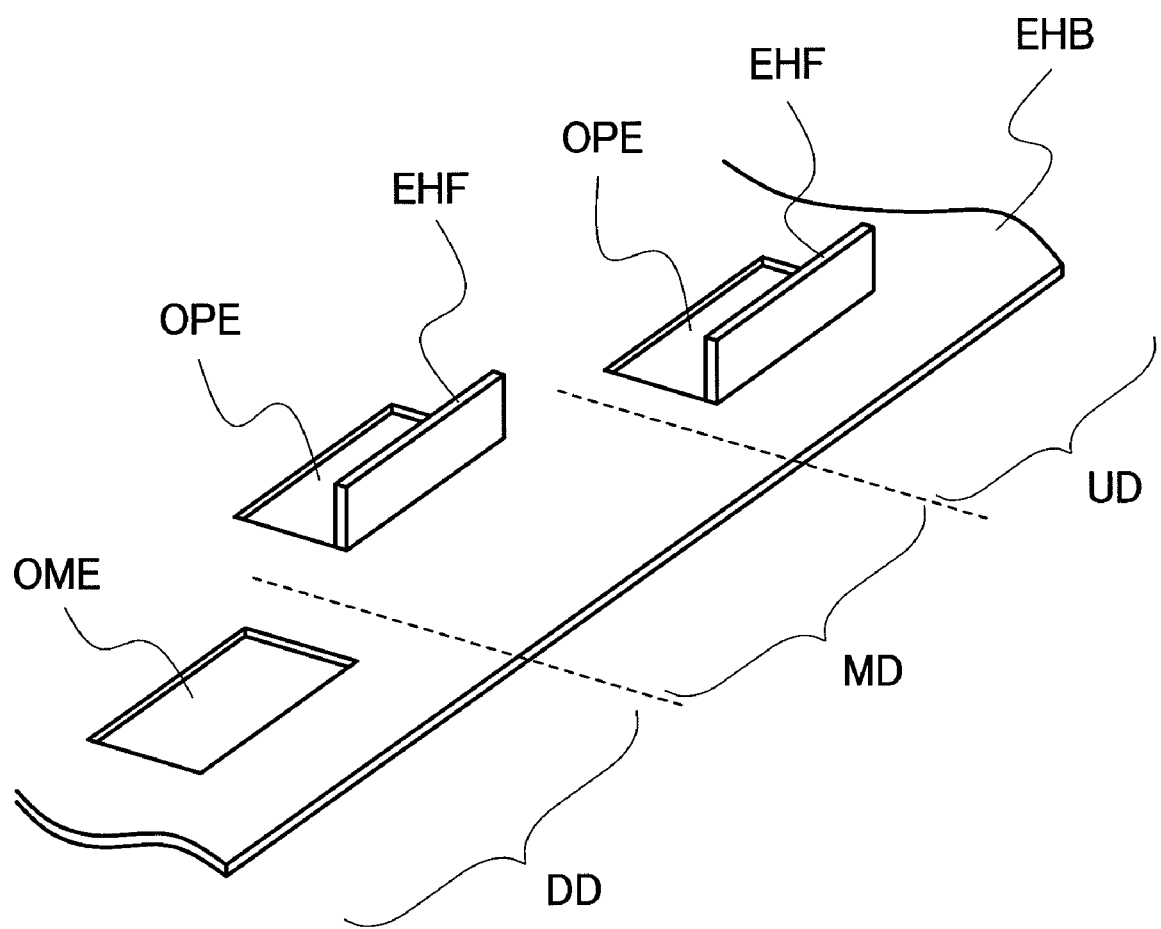
FIG. 4 is a partially enlarged perspective view of a heat dissipating plate and heat dissipating fins included in a liquid crystal display device according to the invention.

FIG. 4 is a perspective view showing the heat dissipating fin EHF formed in the area UD, the heat dissipating fin EHF formed in the area MD, and the opening OME formed in the area DD in the heat dissipating plate EHB.

Each of the heat dissipating fins EHF formed in the area UD and the area MD is formed by forming a U-shaped notch in the heat dissipating plate EHB, and bending and raising the portion surrounded by the notch. This makes it possible to easily form the heat dissipating fins EHF from and integrally with one sheet of the heat dissipating plate EHB. Accordingly, the heat dissipating plate EHB is formed with the opening OPE at the portion adjacent to the heat dissipating fin EHF.

In this case, the opening OPE is overlapped with, for example, the forming area of the opening OMF formed through the lower frame DF. In other words, the opening OMF is formed through the lower frame DF at the location facing to the opening OPE of the heat dissipating plate EHB.

With this configuration, the opening OPE has a function of easily diffusing the heat from the heat dissipating plate EHB to outside the liquid crystal display device through the opening OPE and the opening OMF formed through the lower frame DF unlike the case of the opening OME in the area DD where the heat dissipating fin EHF is not formed.

FIG. 1B is a cross sectional view taken along the line I(b)-I(b) in FIG. 2A, also illustrating the upper frame UF, the middle frame MF, and the lower frame DF which modularize the liquid crystal display panel PNL, the optical sheet OS, and the backlight BL. In addition, FIG. 1B corresponds to a cross sectional view taken along the line b-b in FIG. 1A.

The liquid crystal display panel PNL is placed on the frame-like middle frame MF provided with an opening in the area facing to the liquid crystal display area AR of the liquid crystal display panel PNL.

The periphery of the optical sheet OS is interposed between the lower frame DF of the backlight BL and the middle frame MF.

The heat dissipating plate EHB is disposed between the lower frame DF and the reflective sheet RS placed on the bottom surface of the lower frame DF of the backlight BL.

The heat dissipating plate EHB is provided with the heat dissipating fins EHF each formed by raising the portion of the heat dissipating plate EHB. The heat dissipating fin EHF is formed so as to protrude to the surface of the lower frame DF on the side opposite to the liquid crystal display panel PNL through the opening OMF formed through the lower frame DF.

In this case, the opening OPE formed through the heat dissipating plate EHB due to the formation of the heat dissipating fin EHF is at least partially overlapped with the opening OMF of the lower frame DF.

The upper frame UF disposed to cover the upper surface of the liquid crystal display panel PNL is provided with an opening (window) in the portion facing to the liquid crystal display area AR of the liquid crystal display panel PNL. The peripheral portion of the upper frame UF extends to cover the outer circumference of the middle frame MF and is secured to the lower frame DF.

Figure 1C:
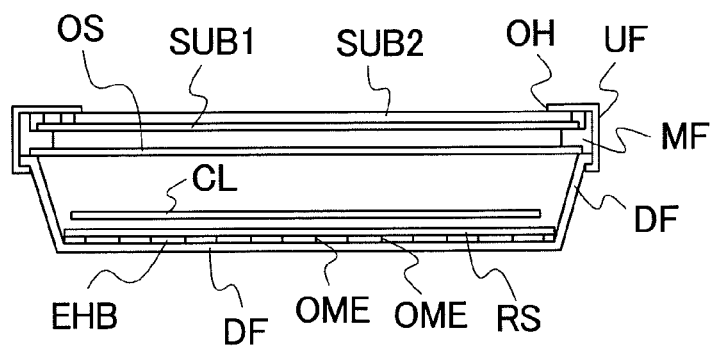
FIG. 1C is a cross sectional view taken along the line c-c in FIG. 1A.

FIG. 1C is a cross sectional view taken along the line I(c)-I(c) in FIG. 2A. In addition, FIG. 1C corresponds to a cross sectional view taken along the line c-c in FIG. 1A.

In FIG. 1C, the same reference signs as shown in FIG. 1B each indicate the same material.

The configuration of FIG. 1C is different from that of FIG. 1B in that fins corresponding to the heat dissipating fins EHF of the heat dissipating plate EHB shown in FIG. 1B are not formed. In addition, the lower frame DF in FIG. 1C is not formed with holes corresponding to the openings OMF shown in FIG. 1B.

The openings OME are formed through the heat dissipating plate EHB, and each of the openings OME is closed at the opening ends thereof with the lower frame DF and the reflective sheet RS disposed on each surface side of the heat dissipating plate EHB.

In the above-described embodiment, in the heat dissipating plate EHB, the openings OME formed in the area DD are formed as the plurality of openings OME disposed in parallel in the x direction in the drawing as shown in FIG. 3A.

Figure 3B:
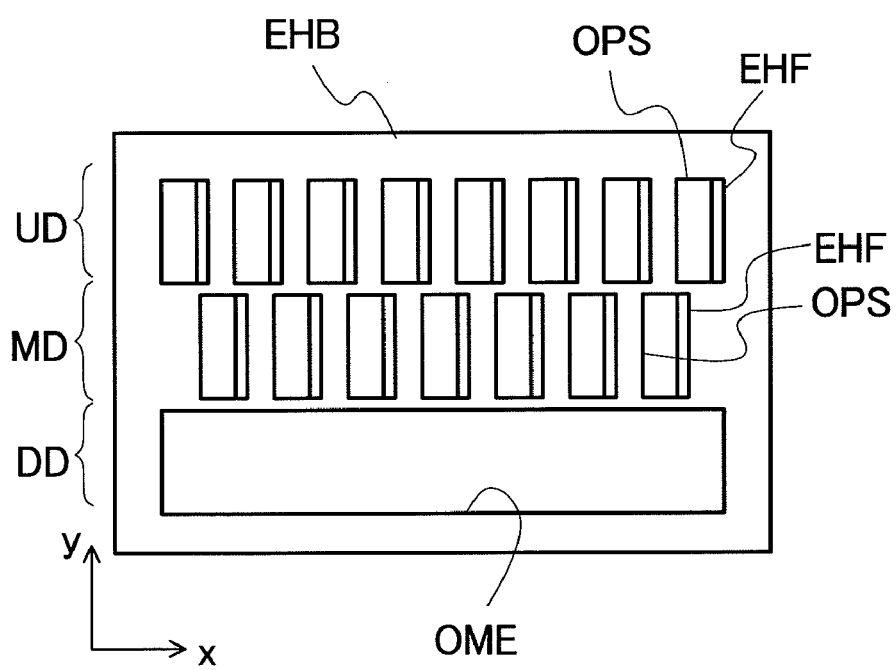

However, this is not restrictive. As shown in FIG. 3B, for example, the opening may be formed as one opening OME extending in the x direction in the drawing. Also in this case, in the area DD which is the lower area of the liquid crystal display device, an air layer retaining heat can be formed in the opening OME.

In the above-described embodiment, the liquid crystal display device is configured such that based on the assumption that the liquid crystal display device has three divided areas each parallel to a horizontal plane from the upper portion to the lower portion thereof, the air layer is provided in the lowermost area among the areas without providing the heat dissipating fin.

However, the area is not necessarily divided into three parts but may be divided into, for example, two parts or four or more parts.

Each of the above-described embodiments may be used alone or in combination. An effect of each of the embodiments can be provided alone or synergistically.

What is claimed is:

1. A liquid crystal display device which is used in a standing state with respect to a horizontal plane comprising:
   a liquid crystal display panel; and
   a backlight disposed at back of the liquid crystal display panel, wherein
   the backlight includes a plurality of light sources disposed in parallel in a plane facing to the liquid crystal display panel, a frame housing the light sources, a heat dissipating plate disposed inside the frame, and a reflective sheet disposed at a surface of the heat dissipating plate on the liquid crystal display panel side, and
   the heat dissipating plate is formed with a heat dissipating fin protruding to a surface of the frame on the side opposite to the liquid crystal display panel through an opening formed through the frame in a portion corresponding to the upper portion thereof and
   formed with an opening which is closed with the frame and the reflective sheet in a portion corresponding to the lower portion thereof.

2. The liquid crystal display device according to claim 1, wherein the heat dissipating fin of the heat dissipating plate is formed by raising a part of the heat dissipating plate, and an opening is formed through the frame at a location facing to an opening of the heat dissipating plate formed by raising the heat dissipating plate.

3. The liquid crystal display device according to claim 1, wherein the frame is formed of aluminum or iron.

4. The liquid crystal display device according to claim 1, wherein the heat dissipating plate is formed of a material having a thermal conductivity higher than that of the frame.

5. The liquid crystal display device according to claim 1, wherein the heat dissipating fin is provided in plural dispersedly in the portion corresponding to the upper portion of the heat dissipating plate.

6. The liquid crystal display device according to claim 1, wherein the opening formed in the portion corresponding to the lower portion of the heat dissipating plate is provided in plural dispersedly.

7. The liquid crystal display device according to claim 1, wherein the heat dissipating fin has a shape extending in the vertical direction.

* * * * *